No. 716,443. Patented Dec. 23, 1902.
A. G. LAWRENCE.
AUTOMATIC RAILROAD SWITCH.
(Application filed Feb. 6, 1902.)
(No Model.) 5 Sheets—Sheet 3.

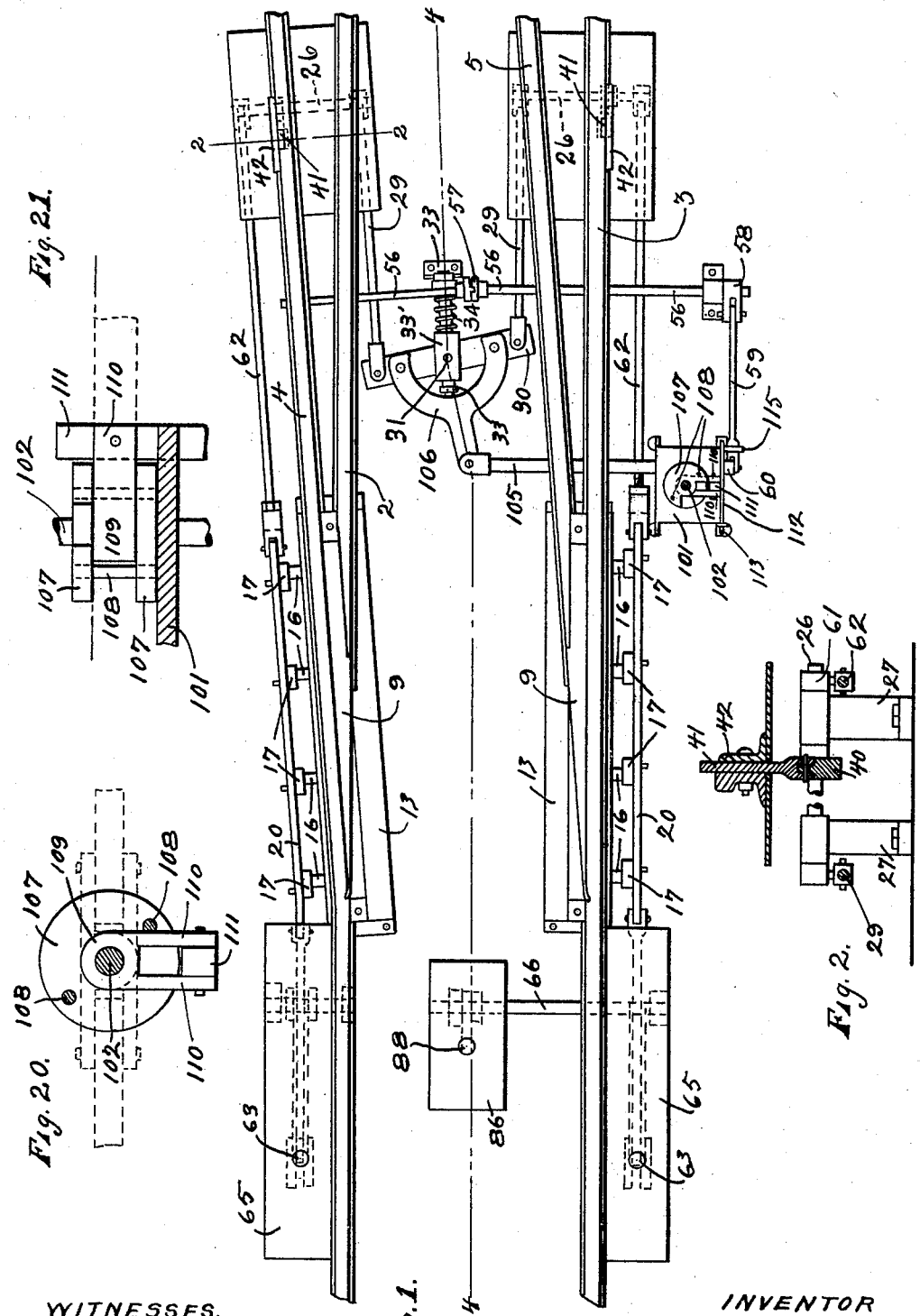

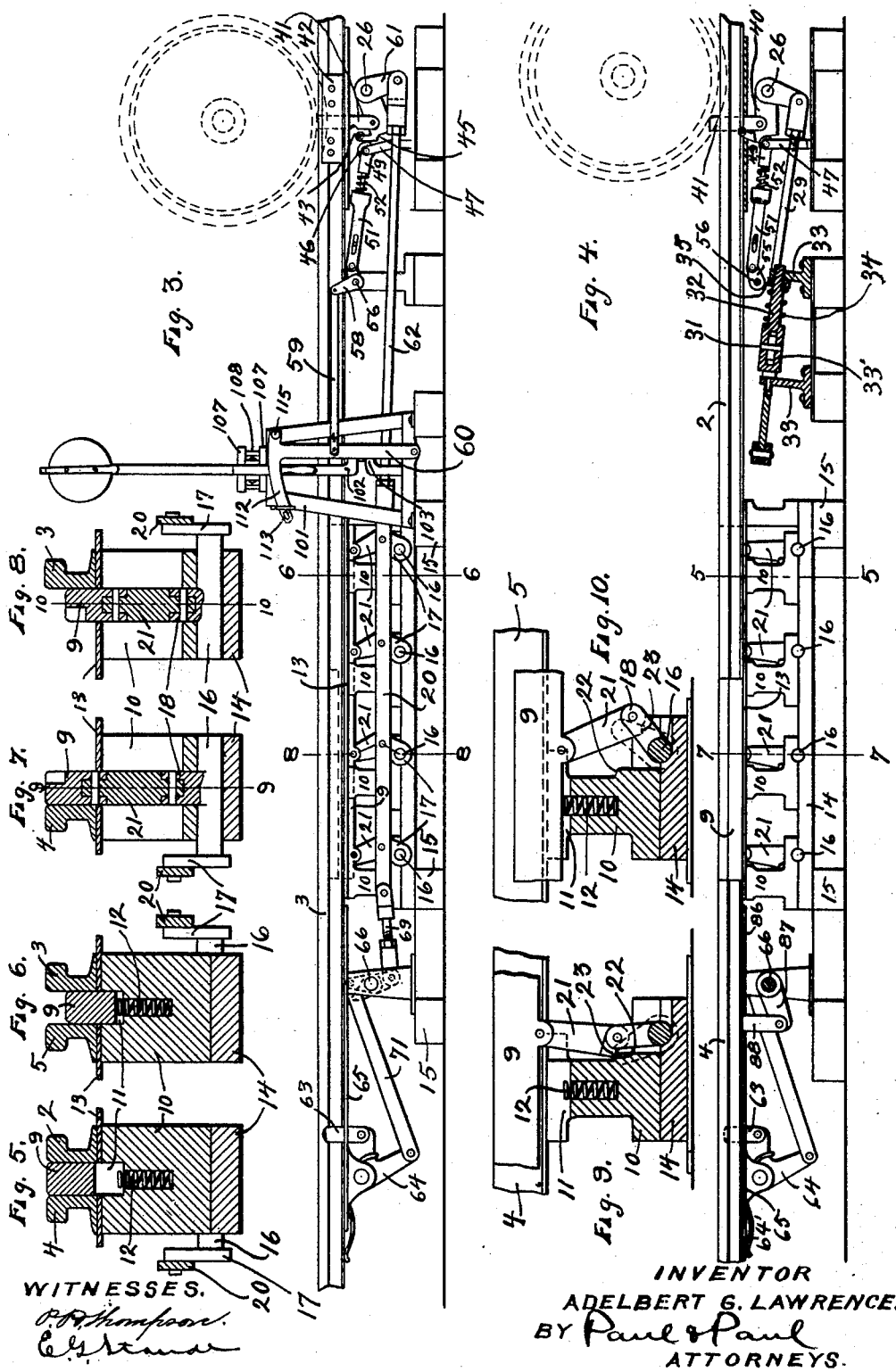

WITNESSES.
P. W. Thompson
E. Strande

INVENTOR
ADELBERT G. LAWRENCE.
BY Paul & Paul
ATTORNEYS.

No. 716,443. Patented Dec. 23, 1902.
A. G. LAWRENCE.
AUTOMATIC RAILROAD SWITCH.
(Application filed Feb. 6, 1902.)
(No Model.) 5 Sheets—Sheet 4.
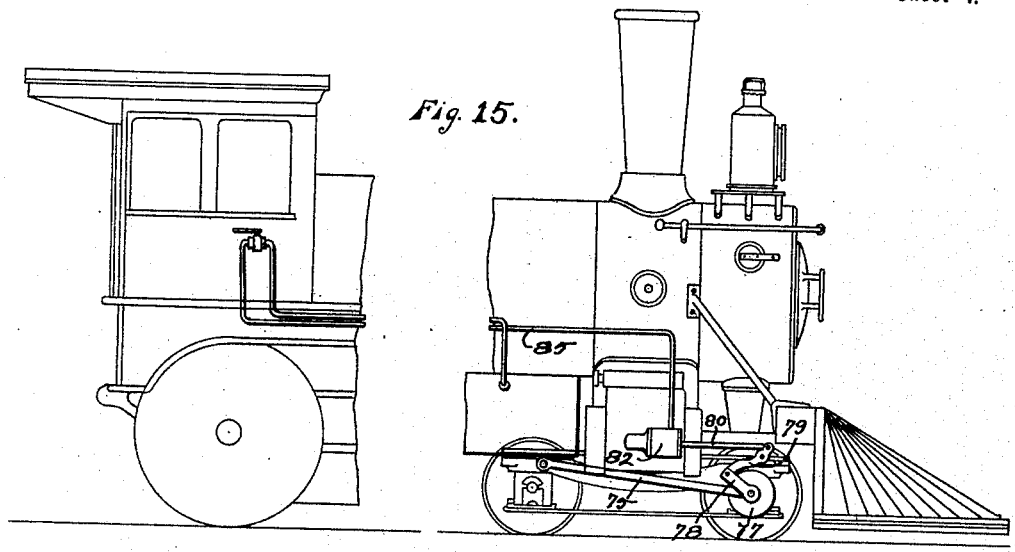
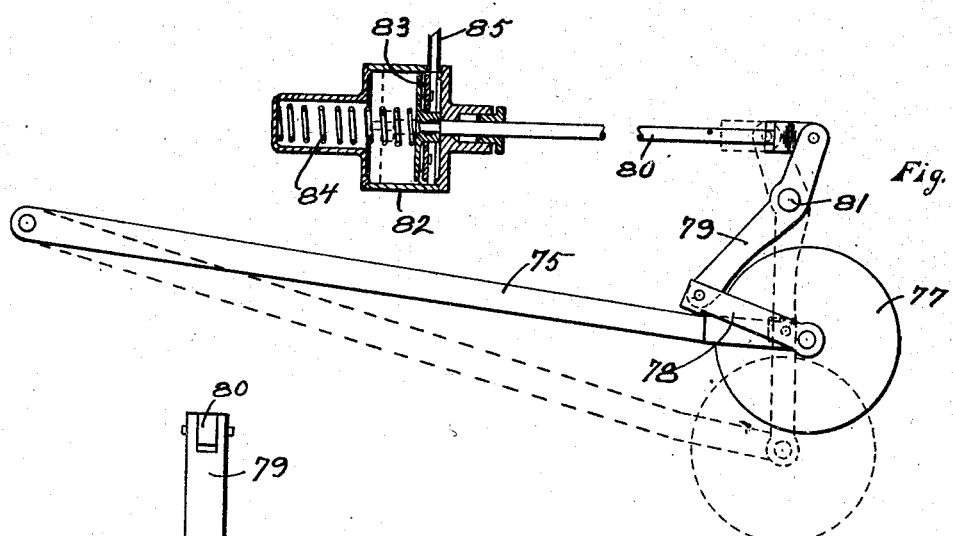
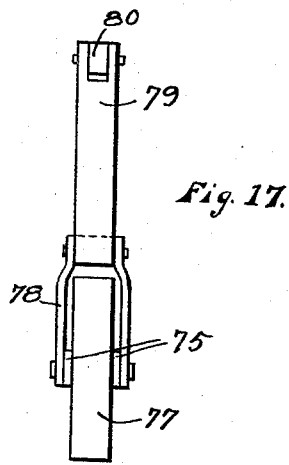
WITNESSES
INVENTOR
ADELBERT G. LAWRENCE.
BY Paul & Paul
ATTORNEYS.

No. 716,443. Patented Dec. 23, 1902.
A. G. LAWRENCE.
AUTOMATIC RAILROAD SWITCH.
(Application filed Feb. 6, 1902.)
(No Model.) 5 Sheets—Sheet 5.

WITNESSES.

INVENTOR
ADELBERT G. LAWRENCE.
BY
ATTORNEYS

UNITED STATES PATENT OFFICE.

ADELBERT G. LAWRENCE, OF MOTLEY, MINNESOTA.

AUTOMATIC RAILROAD-SWITCH.

SPECIFICATION forming part of Letters Patent No. 716,443, dated December 23, 1902.

Application filed February 6, 1902. Serial No. 92,792. (No model.)

*To all whom it may concern:*

Be it known that I, ADELBERT G. LAWRENCE, of Motley, in the county of Morrison and State of Minnesota, have invented certain new and useful Improvements in Automatic Railroad-Switches, of which the following is a specification.

This invention relates to automatic railroad-switches, and is designed particularly as an improvement upon the devices shown and described in Letters Patent issued to me as follows: No. 402,252, dated April 30, 1889; No. 550,926, dated December 3, 1895; No. 590,948, dated September 28, 1897.

The object of my present invention is to provide a reliable positively-acting automatic switch for directing a train from one track to another.

A further object is to provide a switch that cannot accidentally be rendered inoperative by lumps of coal, stone, ice, or other obstructions, and which, if inoperative at any time through breakage or other damage, either accidental or intentional, will not derail a passing train.

A further object is to insure the safety of trains by providing a switch wherein the main and side track rails are each in one piece and each of which affords a solid continuous bearing-surface the full width of the normal tread of the wheels during the passage of trains over the switch.

Other objects of the invention will appear from the following detailed description.

The invention consists generally in, first, vertically-moving guide blocks or bars arranged between the rails and the main track and siding; second, in improved means for supporting and alternately raising and lowering said blocks; third, in improved means for releasing the automatically-operating mechanism preparatory to operating the switch by hand; fourth, in improved connection for the switch-stand, and, fifth, in various constructions and combinations hereinafter described, and particularly pointed out in the claims.

Figure 11:
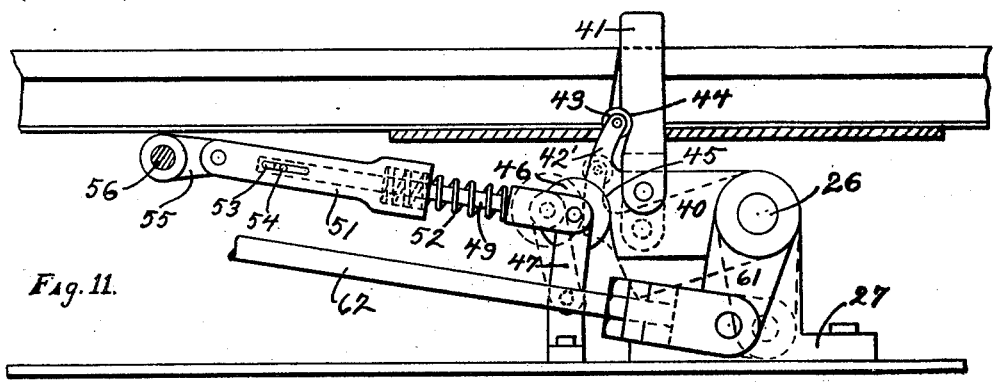
Figure 12:
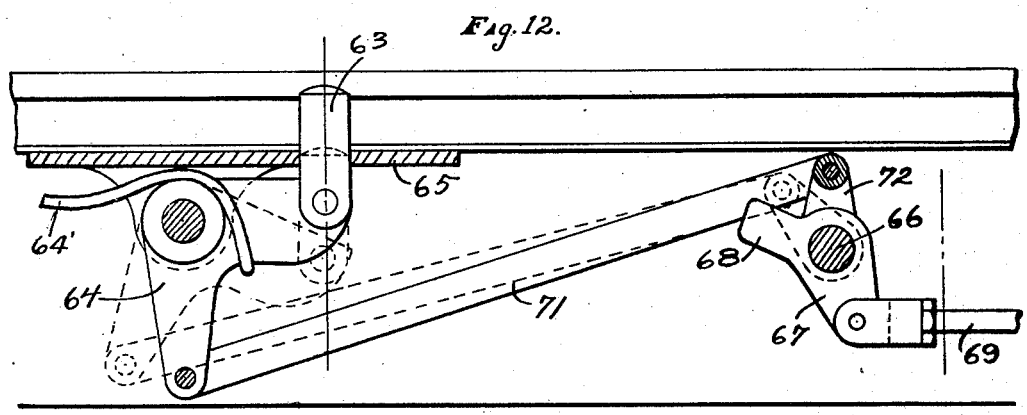
Figure 13:
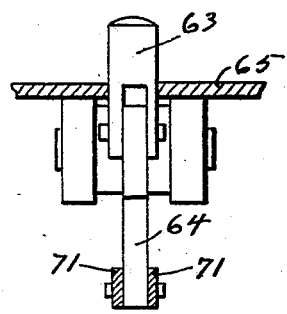
Figure 14:
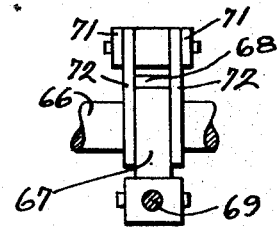
Figure 18:
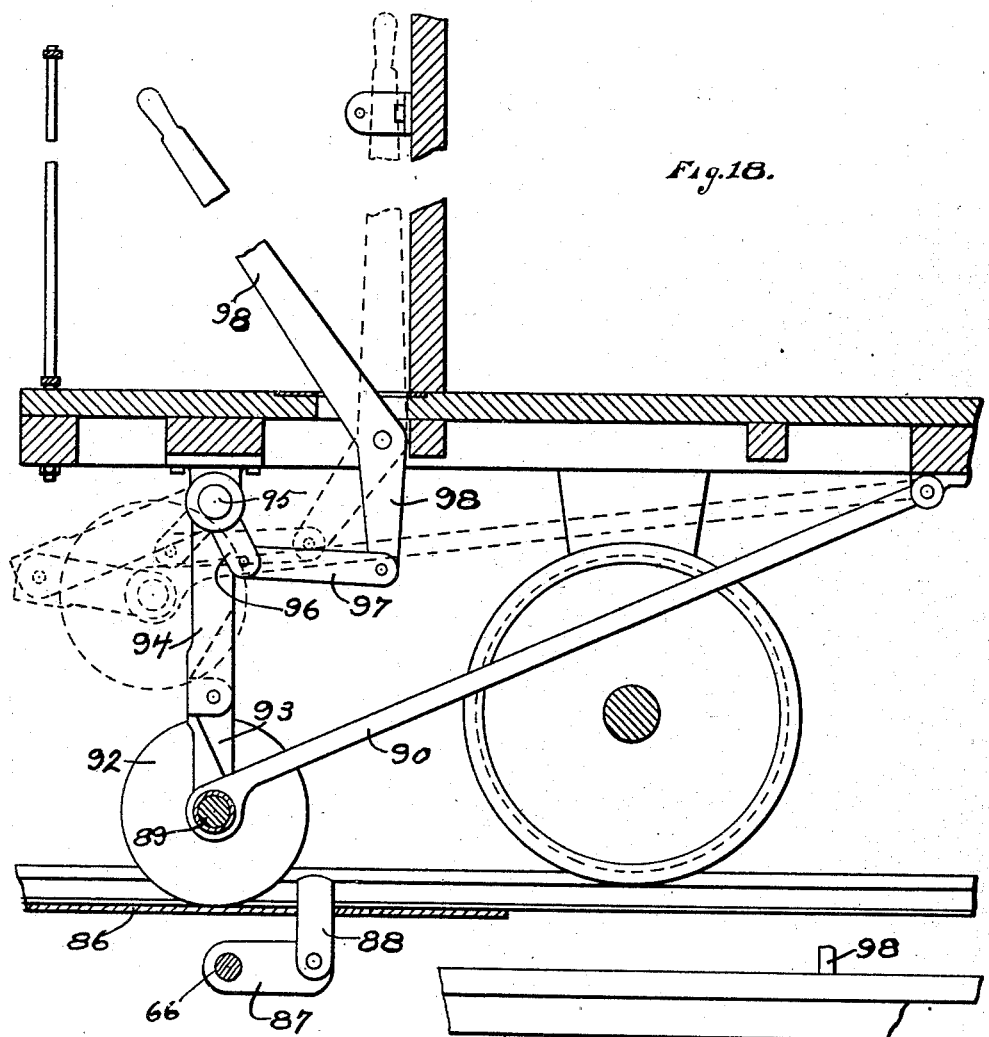
Figure 19:
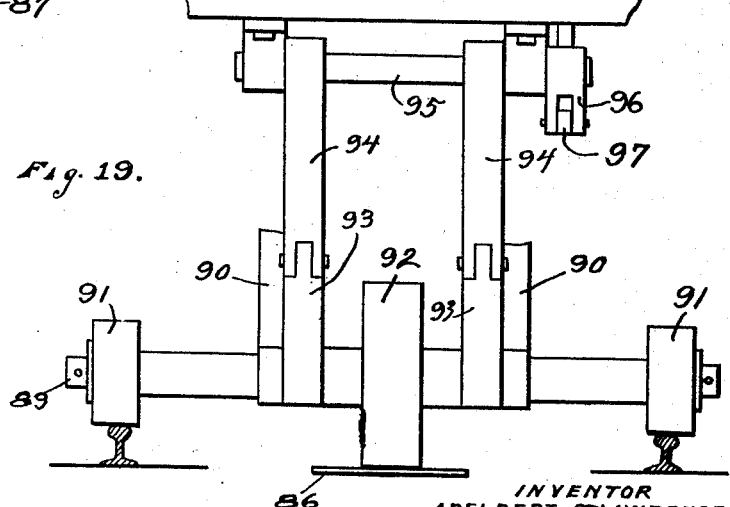

In the accompanying drawings, forming part of this specification, Figure 1 is a plan view of the switch embodying my invention. Fig. 2 is a detailed section on line 2 2 of Fig. 1. Fig. 3 is a side elevation of a portion of the track and switch. Fig. 4 is a section on line 4 4 of Fig. 1. Fig. 5 is a section on line 5 5 of Fig. 4. Fig. 6 is a section on line 6 6 of Fig. 3. Fig. 7 is a section on line 7 7 of Fig. 4. Fig. 8 is a section on line 8 8 of Fig. 3. Fig. 9 is a section on line 9 9 of Fig. 7. Fig. 10 is a section on line 10 10 of Fig. 8. Fig. 11 is a detail of the automatic operating means. Fig. 12 is a detail of an operating means adapted to be operated by a locomotive. Fig. 13 is a section on line 13 13 of Fig. 12. Fig. 14 is a section on line 14 14 of Fig. 12. Fig. 15 is an elevation showing one form of device for operating the switch from a locomotive. Figs. 16 and 17 are details of the same. Figs. 18 and 19 are details illustrating a switch-operating mechanism applied to a car or caboose. Figs. 20 and 21 are details of the switch-stand and operating-handle.

In the drawings, 2 and 3 represent the rails of a main track, and 4 and 5 the rails of a siding. The rail 3 of the main track and the rail 4 of the siding are each preferably a continuous rail, such as is ordinarily used in the construction of a point-switch. The rails 2 and 5, parallel, respectively, with the rails 3 and 4, are arranged with a space between the end of each of such rails and the adjacent continuous rail. (See Fig. 1.) The rails 2 and 5 are stationary, and I dispense entirely with the ordinary pivoted point such as is generally used in railway-switches.

Arranged in the spaces between the ends of rails 2 and 5 and the continuous rails 4 and 3 are the vertically-movable guide-blocks 9, each of which is adapted to form a connection or continuation between one of the rails 2 or 5 and the corresponding continuous rail 4 or 3. These guide-blocks 9 are each capable of a vertical movement, so that each block may be raised to bring its upper surface substantially flush with the tops of the rails, as shown in Fig. 5, or each block may be lowered, so as to be considerably below the tops of the rails, as shown in Fig. 6. The guide-blocks 9 and the rails 3 and 4 for a distance substantially equal to the length of said blocks are supported upon a series of standards 10, and these standards are provided with recesses 11, into which the guide-blocks 9 move when they are depressed. Springs 12 are arranged in sockets at the bottoms of the recesses 11, and these springs serve as cushions for the guide-blocks 9, said blocks resting upon such springs when depressed. The top of each guide-block is recessed on a diagonal line, as indicated in Fig. 1. These guide-blocks are arranged so that when one is raised the other is depressed, and the raised block forms a guide from one of the rails 3 or 4 to the corresponding rail 5 or 2. When the switch is set for the main track, the guide-block 9 between the rails 3 and 5 is lowered and the other guide-block 9 is raised. The raised guide-block now forms a guide from the straight part of the rail 4 to the rail 2, such guide being parallel to the rail 3. When the switch is set for the side track, the guide-block between the rails 3 and 5 is raised and forms a guide from the rail 3 to the rail 5. The other guide-block is now depressed, leaving a clear space between the rails 4 and 2. Plates 13 are preferably provided on the tops of the standards 10, these plates being provided with recesses corresponding in size to the blocks 9, so that said blocks may be raised and lowered through said recesses. (See Figs. 5, 6, 7, and 8.) The standards 10 preferably rest on a suitable plate 14, and this plate is suitably supported on cross-ties 13.

I may use any suitable means for raising and lowering the guide-blocks 9. I have here shown a series of short shafts 16, suitably supported on the plate 14, and each of these shafts is provided with two crank-arms 17 and 18. The crank-arms 17 are preferably on the outer ends of the shafts 16, while the crank-arms 18 are located beneath the guide-blocks 9. A bar 20 is connected to all of the crank-arms 17. A series of links 21 connect the crank-arms 18 with the guide-blocks 9. By moving bar 20 longitudinally the shafts 16 are simultaneously rocked, and thereby the corresponding guide-block 9 is raised or lowered. Lug 22 is provided on each of the standards 10, and this lug is adapted to be engaged by a projection 23 on the link 21 when the guide-blocks are elevated. By rocking the shaft 16 in one direction the links 21 and crank-arms 18 are folded, and thereby the guide-block supported by said links and crank-arms is lowered. By straightening out the links and crank-arms the guide-block is raised. To hold each guide-block in its raised position, the points of connection between the crank-arms 18 and the links 21 are allowed to pass slightly beyond the center before the projections 23 come in contact with the lugs 22, the spring cushions under the blocks permitting this movement. With this construction and arrangement each guide-block when elevated is locked in this position and cannot be depressed by any load to which it may be subjected.

The guide-blocks 9 have narrow upper faces, and when a train is passing over a switch there will be no time when any wheel is supported entirely by either one of said guide-blocks. In other words, before any passing wheel leaves one of the fixed rails a portion of the tread of the wheel will come into engagement with and be supported by the other fixed rail. For instance, if a train is passing from left to right on the track represented in Fig. 1 and the switch is set for the main track before any wheel passes entirely off from the rail 4 a portion of its tread will be brought onto the rail 2 and the block 9 will serve simply as a guide to direct the flanges of the wheels from the part of the rail 4 that is parallel to the rail 3 to the rail 2, thereby causing the train to keep on the main track. With this construction and arrangement it will be seen that any failure to operate on the part of the guide-blocks or any tampering with the switch will not cause a derailment of the train and that, in fact, with this switch it is impossible for a train to be derailed.

Various mechanisms may be provided for operating the rock-shafts to raise or depress the guide-blocks; but I prefer a construction quite similar to that shown and described in my patents herein referred to, certain improvements and modifications being made, as hereinafter described. Beneath the rails of the main and side tracks I provide short shafts 26, mounted in suitable bearings 27. These shafts are provided, usually between the rails 2 and 5, with suitable crank-arms, connected by rods 29 with a walking-beam 30, mounted by a pin 31 on a short shaft 32, mounted in bearings 33. This shaft is preferably provided with an enlarged portion 33', through which the walking-beam 30 extends and in which it is secured by the pin 31, above referred to. This shaft 32 is capable of longitudinal movement in its bearings, and a spring 34 surrounds the shaft 32 and bears at one end upon the enlargement 33' and at the other upon a collar 35, that is arranged upon the shaft 32 and against one of the bearings 33. This spring serves to cushion the connection between the rock-shafts 26 and prevents too great a shock upon the walking-beam and its supporting-shaft when one of the plungers 41, hereinafter referred to, is suddenly depressed. The shafts 26 are also provided with the crank-arms 40, to each of which is pivoted a plunger 41. This plunger is arranged to pass upwardly by the side of or through a recess in the rail, and it is adapted to project above its upper surface. (See Fig. 2.) A plate 42 is preferably bolted to the side of the rail outside of the plunger 41. One of the plungers is arranged in connection with the main-track rail 3 and the other in connection with the side-track rail 4, and it will be noted that through the walking-beam connection, already described, as one of said plungers is depressed the other will be automatically raised. These plungers extend above the surface of the rails and are adapted to be operated by the pressure of any car-wheel that passes over them. For the purpose of preventing accidental movement of the plungers I provide a tension device similar in many respects to that shown and described in my other patents, hereinbefore referred to. As here shown, the crank-arm 40 is provided at its free end with the upwardly-projecting curved arm 42, with a roller 43 at its end. The plunger 41 is provided with a recess 44, and when the plunger is in its elevated position the wheel 43 will engage this recess. (See Figs. 4 and 11.) The end of the crank-arm 41 is also provided with a shoulder 45, which is adapted to be engaged by a wheel 46, arranged upon a pivoted standard 47. Connected to the upper end of the standard 47 is a tension device consisting of a rod 49, projecting into a socket in a rod 51, with a spring 52 surrounding the rod 49 and engaging a shoulder thereon and also engaging the rod 51. The rod 51 is preferably provided with a slot 53, and a pin 54 is arranged in the rod 49 and engages in said slot. The end of the rod 51 is connected to a crank-arm 55 on a shaft 56. The shaft 56 extends beneath the rails of both tracks, and the tension device already described is provided in connection with each of the plungers 41. The shaft 56 is preferably made in two parts connected together by a coupling 57. At its outer end the shaft 56 is connected to a crank-arm 58, and this crank-arm is connected by a rod 59 to the lever 60, arranged at the switch-stand, hereinafter described. When the shaft 56 stands in the position shown in Figs. 4 and 11, with the crank-arm 55 extending toward the shaft 26, the spring 52 will be compressed and the wheel 46 will be held with considerable pressure against the end of the crank-arm 40, and when the plunger 41 is in its elevated position the wheel 46 will engage the recess 45 in the crank-arm 40, as shown in Fig. 4, and the plunger 41 cannot now be depressed by any ordinary pressure, such as by the weight of a person standing or stepping upon the plunger. When a car-wheel passes along the track and over the end of the plunger 41, the pressure from said plunger is transmitted directly to the roller 43 and the arm 42 and through the shoulder 45 directly to the wheel 46 and pivoted standard 47. The first action thereof is to move the wheel 46 and turn the standard 47 against the tension of the spring 52. At the same time as the crank-arm 40 is depressed the shaft 26 is rocked, and through the means already described the other shaft 26 is also rocked in the opposite direction and the other plunger is elevated. The rock-shafts 26 are each also provided with a crank-arm 61, that is connected to the longitudinally-movable bar 20 by a connecting-rod 62. At the same time, therefore, that the plunger 41 is depressed by the movement of the car-wheel thereover and the shaft 26 is rocked, the crank-arm 61 and connecting-rod 62 move the bar 20 longitudinally, and thereby fold the crank-arms 18 and links 21 together, moving them from the position shown in Fig. 9 of the drawings to the position shown in Fig. 10. This movement lowers the guide-block 9, connected therewith. At the same time and through a similar connection the other rock-shaft 26 is rocked in the opposite direction and the guide-block controlled by it is elevated, the crank-arms and links connected to it being moved from the position shown in Fig. 10 to that shown in Fig. 9.

With the construction already described, it will be seen that the switch may be automatically operated by a train moving on the main track from right to left of a track shown in Fig. 1 of the drawings or moving on the side track toward the main track or from right to left on the construction shown in Fig. 1 in the drawings. If the switch is set for the side track, the plunger by the side of the rail of the main track will be in an elevated position. The train moving on the main track toward the switch will depress this plunger, depressing the guide-block connected therewith and at the same time elevating the other plunger and raising the other guide-block or the one that forms the connection between the rail 2 and the rail 4.

This construction possesses certain advantages over that shown and described in either one of my former patents. In the first place I find it an advantage to have the plunger operated by the tread of the passing wheel instead of its flanges, for the reason that there is considerable variation in the depth of car-wheel flanges, and if a plunger will set so as to be properly operated by a flange of a considerable depth it would not be properly operated by flanges of other depths unless special provisions in the construction were made therefor. With my present construction it is of course immaterial what depth or flange there may be to any wheel. There is a further advantage in having the vertical plungers pivotally connected to the crank-arms of the rock-shafts 26, as by this arrangement each plunger is permitted to have a vertical movement, and the pressure of the car-wheels thereon is substantially in a vertical direction. This causes a positive operation and prevents any chance of the movement of the plunger being obstructed by any accumulation of ice or snow. There is another advantage in the direct connection between the rock-shaft and the links and crank-arms by which the guide-blocks are raised and lowered. The guide-blocks, as herein shown, are operated in a positive manner to raise and lower them and nothing can interfere with their direct movement. Moreover, it will be apparent that even if the blocks should not be moved at the proper time they will not constitute a sufficient obstruction to cause a derailment of the train.

I also prefer to provide means for operating the switch from the locomotive when traveling toward the switch or from left to right on the track represented in Fig. 1 of the drawings. For this purpose I provide at each side of the main track a vertically-movable plunger 63. (See Figs. 3, 4, 12, and 13.) This plunger is pivotally connected to a bell-crank lever 64, that is mounted upon a short shaft beneath a plate 65, arranged at each side of the track. The lever 64 is provided with a spring 64', that tends to hold the plunger 63 in its elevated position. A short shaft 66 is also mounted in bearings beneath each of the rails, and each of said shafts is provided with a crank-arm 67 and a projection 68. The crank-arm 67 is connected to the longitudinally-movable rod 20 by the adjustable connecting-rod 69. The bell-crank lever 67 is provided with a connecting-rod 71, that is pivotally connected to links 72, loosely mounted on shaft 66. This connecting-rod is made in two parts, one part being connected to each of the links 72, and these parts pass on the opposite sides of the projection 68. Whenever, therefore, the plunger 63 is depressed, the bell-crank lever 64 is moved, and through the connecting-rod 71, links 72, and projection 68 the shaft 66 is rocked, and thereby the corresponding guide-block 9 is depressed. The manner of connecting the plunger 63 to the shaft 66 permits the rocking of said shaft without movement of the plunger 63, so that the presence of the plunger 63 does not interfere with the operation of the switch by the plungers 41. With this construction it is possible to operate the switch so as to set it either for the main or side track from a locomotive approaching said switch. For this purpose I provide, preferably upon each side of the locomotive, a vertically-movable roller, which may be thrown down, so as to roll along by the side of the track and come in engagement with the plunger 63, and thereby depress said plunger. Any suitable device may be employed upon the locomotive for this purpose. I have here shown a swinging arm 75, carrying a roller 77. Toggle-joint levers 78 and 79 are connected to the swinging arm 75 and are pivotally supported at 81 upon the truck-frame of the locomotive. The lever 79 is preferably connected to a piston-rod 80, which passes into a steam-cylinder 82 and is connected to a piston 83. A spring 84 is arranged in this cylinder and engages said piston. A suitable steam-supply pipe 85 is connected to the cylinder 82. (See Figs. 15, 16, and 17.) When it is desired to depress the roller 77, steam is admitted to the cylinder 82, thereby moving the piston therein and straightening out the toggle-joint levers and moving the roller 77 downward close to the side of the track. This roller will then engage the plunger 63 on the corresponding side of the track and through the means already described will depress the corresponding guide-block 9. When this guide-block is depressed, the other guide-block, as hereinbefore described, will be elevated.

I also prefer to provide means that may be operated from a car or caboose that is passing from the side track to the main track to set the switch for the main track, so that when a train that has been standing on the side track pulls onto the main track the switch may be set for the main track without stopping the train. For this purpose one of the short shafts 66 (one that is connected to the rod 20, controlling the guide-block for the main track) is extended beneath the rail 3 and to a point below the center of the track, where it is supported in suitable bearings arranged beneath the plate 86. This shaft has a crank-arm 87 arranged thereon, and a plunger 88 is pivoted to this crank-arm and extends upward through the plate 86 at a point near the center of the track. Whenever the switch is set for the side track, this plunger will stand in the elevated position shown in Fig. 18, and by depressing it the switch may be changed and set for the main track. For the purpose of operating this plunger I prefer to provide upon the rear end of the rear car or caboose of a train a swinging frame carrying a roll or wheel that may be brought into contact with the plunger 88 for the purpose of depressing the same. As here shown, a shaft 89 is mounted in the swinging rods 90, pivotally supported beneath the car. The shaft 89 is provided with the small rolls or wheels 91, adapted to rest on the track, and the roll 92, adapted to engage the plunger 88. The shaft 90 has also connected to it the toggle-joint levers 93 and 94, the levers 94 being secured to the shaft 95. This shaft has a bell-crank lever 96 connected by a link 97 to the operating-lever 98. By means of the lever 98 the wheel or roll 92 may be raised or lowered at any time by an operator on the car or caboose.

It is frequently desirable to operate the guide-blocks by hand, and I therefore prefer to provide a switch-stand 101, wherein a vertical switch-rod 102 is mounted at its lower end in a suitable support and is provided with an offset or crank 103, to which is connected rod 105, having connected with it a forked lever the ends of which are connected to the walking-beam 30. Secured on the rod 102 above the switch-stand are disks or plates 107, connected by pins 108, and between said disks on said rod I provide a loose ring 109, having a lug 110, whereon a swinging handle 111 is pivoted. This handle normally hangs in a vertical position and is swung up in a horizontal position when it is desired to operate the switch by hand. The pins 108 being upon opposite sides of the rod 102 will allow the ring 109 to turn one-fourth the circumference of the disks before its lugs engage one of the pins and locks the swinging handle against further movement in that direction. This freedom of movement permits the mechanism to be operated automatically by the wheels of the passing train without affecting the hand-switch device.

To prevent any one from tampering with the hand-switch device, the upright lever 60, to which the rod 59 is connected, is provided with an arm 112. This arm moves in front of the swinging handle 111 when said handle is in a vertical position, and thereby prevents the handle from being moved into a horizontal position, and hence prevents the switch from being operated by hand. The end of the arm 112 is adapted to pass through a loop or staple 113 to receive a suitable lock, by means of which it may be secured in position. This will provide means for locking the hand-switch. The arm 112 will also preferably be provided with a suitable operating-handle 115. When it is desired to operate the switch by hand, the lever 60 is unlocked and is moved so as to bring the arm 112 away from the swinging handle 110. This movement of the lever 60 turns the shaft 56 and throws the crank-arm 55 in the opposite direction, thereby releasing the tension upon the spring 52 and leaving the plunger 41 and crank-arm 40 in position for easy movement. The handle 110 may now be swung into a horizontal position and be used to turn the rod 102 and, through the lever 106 and the walking-beam 30, to rock the shafts 26, and thereby raise one of the guide-blocks and depress the other.

As usually constructed the spaces filled by the guide-blocks 9 need be only of sufficient width for the passage of the wheel-flanges and will be little, if any, wider than the space left for the passage of the flanges in the standard frog. When the train is crossing the spaces occupied by the vertically-movable blocks, one standard width of each track will be under the tread of the wheels at all points in their passage, and although the blocks can easily support the weight of the train passing over them they are not necessarily subjected to any pressure from the passing wheels, their chief function being simply to direct the wheels across the space from one section of the track to the other. If a train is passing out of a switch onto the main track, the parts being arranged as shown in Fig. 1, the vertically-movable blocks may be entirely absent without disturbing the passage of the wheels from one track to the other. In approaching a switch on a straight track or on a curve where the main track is on the outside the wheels will keep in the main track, even if the blocks fail to operate, and spaces normally filled by them are left open, unless, of course, some obstruction causes a diversion of the wheels from the straight course.

Although the guide-blocks are essential to the safety of the train, they are not necessary when the wheels are traveling in a straight course, presuming that all details of the construction have been carried out. It is only when the wheels are to be diverted from one track to the other that the vertically-movable blocks become essential, and at that time they are required to perform their maximum service. The springs beneath the guide-blocks form cushion-seats for them; but, if preferred, said springs may be omitted.

It will be understood that the details of construction of the device herein shown and described may be materially modified without departing from my invention.

I have shown the plunger 41 connected to the crank-arm 40 and shaft 26 at a point near the end of said arm. It will be understood, however, that by varying the point of connection between said plunger and said arm the amount of pressure required to depress said plunger and operate the switch may be varied. The nearer the pivotal connection between the plunger and the crank-arm is to shaft 26 the greater the pressure required to depress the plunger and operate the switch. If preferred, this plunger may be connected to the crank-arm 40 by a slotted connection or a connection having considerable play, so that there will be more or less lost motion between the plunger and the crank-arm. The arm 42' on the crank-arm 40, engaging the notch 44 in the plunger, will raise said plunger and take up any lost motion, and when the plunger begins to descend and until this lost motion is taken up the action of the plunger will be directly upon the arm 42. This permits any reasonable variation in the movement of the plunger without interfering with the operation of the switch.

This switch may obviously be used for ordinary steam-roads, for electric roads, and whether used for ordinary traffic or for city or suburban railways.

Having thus described my invention, I claim as new and desire to secure by Letters Patent—

1. The combination, with fixed main and side track rails, of vertically-movable guide-blocks interposed between them and adapted to engage the wheel-flanges and direct a train from one track to the other, folding crank-arms and links connected with and moving said guide-blocks, and means adapted to be engaged by a car-wheel passing along said track to simultaneously raise one of said guide-blocks and lower the other, substantially as described.

2. The combination, with fixed main and side track rails, of vertically-movable guide-blocks interposed between them and adapted to engage the wheel-flanges and direct a train from one track to the other, a vertically-movable plunger for each of said tracks arranged to be operated to simultaneously raise one of said blocks and lower the other, substantially as described.

3. The combination, with fixed main and side track rails, of vertically-movable guide-blocks interposed between said rails and adapted to direct a train from one track to the other, a vertically-movable plunger provided in connection with each track and arranged to be depressed by the wheels of a train moving over said track, means connecting said plungers with each other and with said vertically-movable guide-blocks, whereby as one plunger and the corresponding guide-block is depressed, the other plunger and corresponding guide-block is raised, substantially as described.

4. The combination, with main and side track rails, of interposed vertically-movable guide-blocks adapted to engage the wheel-flanges and direct a train from one track to the other, folding crank-arms and links connected with and moving said blocks, and means adapted to be operated by a car-wheel of a passing train for moving said crank-arms and links and thereby raising or lowering said guide-blocks, substantially as described.

5. The combination, with main and side track rails, of interposed vertically-movable guide-blocks adapted to engage the wheel-flanges and direct a train from one track to the other, and means adapted to be engaged and moved for raising and lowering said guide-blocks, substantially as described.

6. The combination, with main and side track rails, of vertically-movable guide-blocks interposed between the rails on each side of the track and adapted to engage the wheel-flanges and direct a train from one track to the other, and means for raising or lowering said blocks, substantially as described.

7. The combination, with main and side track rails, of vertically-movable guide-blocks having recesses forming beveled faces to engage the wheel-flanges and direct a train from one track to the other, and means for raising and lowering said blocks, substantially as described.

8. The combination, with main and side track rails, of vertically-movable guide-blocks interposed between the rails on each side of the track and adapted to engage the wheel-flanges and direct the train from one track to the other, crank-arms and folding links pivotally connected to said guide-blocks and adapted to raise and lower said blocks and means for operating said crank-arms and links to raise or lower said blocks.

9. The combination, with main and side track rails, of vertically-movable guide-blocks interposed between them on each side of the track and adapted to engage the wheel-flanges and direct a train from one track to the other, means for raising and lowering said blocks, and a switch-stand operatively connected with the train-operated means to permit the movement of said guide-blocks by hand, substantially as described.

10. The combination, with main and side track rails, of vertically-movable guide-blocks, crank-arms arranged beneath said blocks, links pivotally connecting said crank-arms and said blocks and a fixed stop arranged to be engaged by said links when said links are swung to a position past a vertical line through the pivots of the links and the centers of the crank-arms, substantially as described.

11. The combination, with the main and side track rails, of a series of standards supporting said rails and provided with recesses, the vertically-movable guide-blocks interposed between said rails and adapted to be lowered into the recesses in said standards, and means arranged to raise and lower said guide-blocks, substantially as described.

12. The combination, with main and side track rails, of the recessed standards 10, vertically-movable guide-blocks arranged, when lowered, to enter said recesses, springs arranged in said recessed standards and forming cushions for said blocks, and means for raising and lowering said blocks, substantially as described.

13. The combination, with the main and side track rails, of a vertically-movable guide-block, the crank-arms arranged below said block, links connecting said crank-arms and said block and a longitudinally-movable bar connecting said crank-arms, means for moving said bar and thereby raising or lowering said block.

14. The combination, with main and side track rails, of vertically-movable guide-blocks, crank-arms provided beneath said blocks, links pivotally connecting said crank-arms and said blocks, and lugs or projections on said links adapted to engage fixed stops when said links are swung to a position past a vertical line passing through the centers of their pivots and through the centers of the crank-arms and means for locking said crank arms, substantially as described.

15. The combination, with main and side track rails, of the vertically-movable guide-blocks, means arranged to raise or lower said blocks and a suitable tension device connected with the operating means, substantially as described.

16. The combination with the main and side track rails of the vertically-movable guide-blocks adapted to engage the wheel-flanges and direct a train from one track to the other, folding crank-arms and links connected with and moving said blocks, and means, arranged to be operated by a wheel of a car or locomotive, for raising or lowering said blocks.

17. The combination, with the switch-stand and its rod, of a lever mechanism arranged to be operated by the wheels of a passing train, operative means connecting said switch-rod and said mechanism, a suitable handle loosely mounted on said rod and permitting the rotation of said rod when said lever mechanism is inoperative, a suitable stop provided on said rod with which the switch-handle is engaged, when the latter is operated to throw the switch by hand.

18. The combination, with the vertically-movable guide-blocks, of a lever mechanism connected therewith and adapted to be operated by a passing train, tension devices connected with said mechanism, a switch-stand, a lever connected with said tension device, a swinging switch-handle loosely mounted on said rod and normally located in a vertical position, and means on said switch-rod for limiting the horizontal swinging movement of said switch-handle when in operative position, substantially as described.

In witness whereof I have hereunto set my hand this 29th day of January, 1902.

ADELBERT G. LAWRENCE.

In presence of—
A. C. PAUL,
C. G. HANSON.